Jan. 16, 1934.  G. A. LYON  1,943,922
COVER FOR SPARE TIRES
Filed Dec. 22, 1928
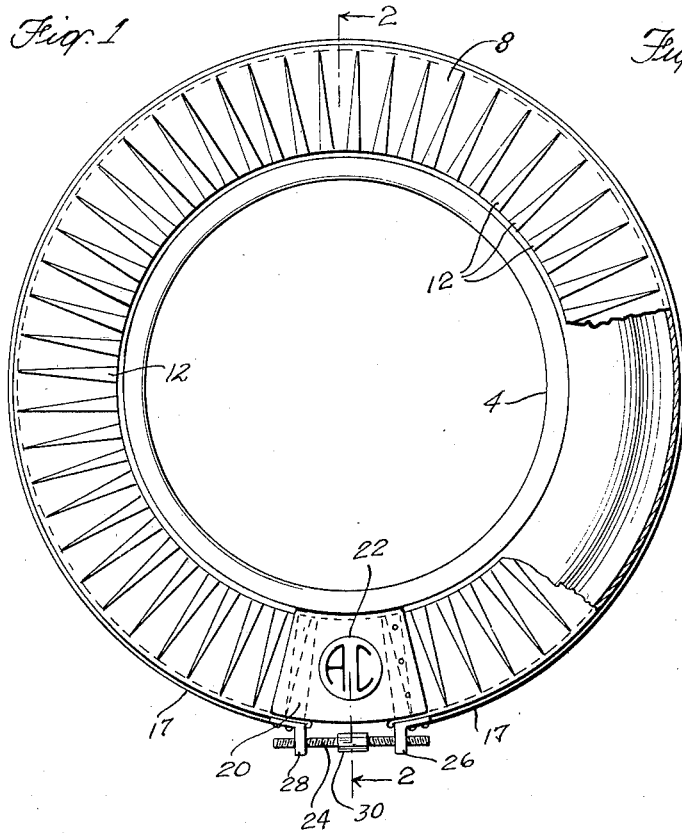
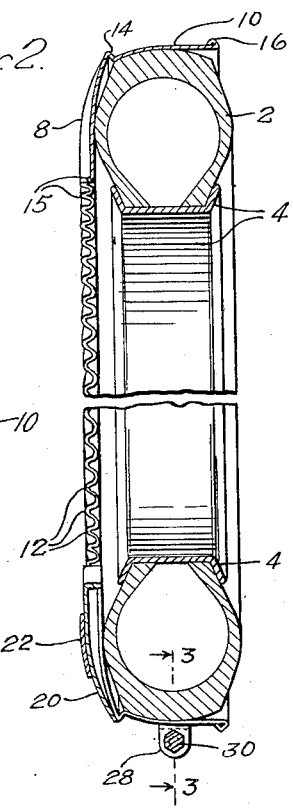
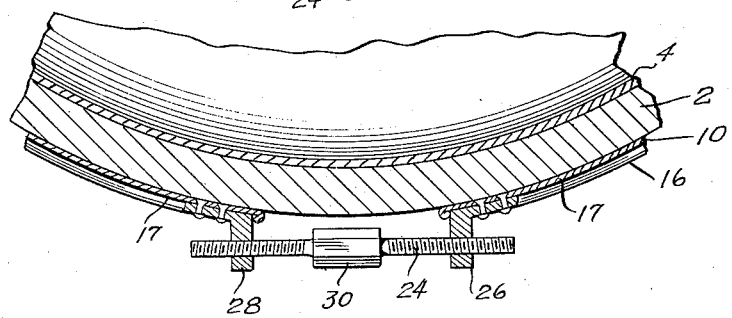
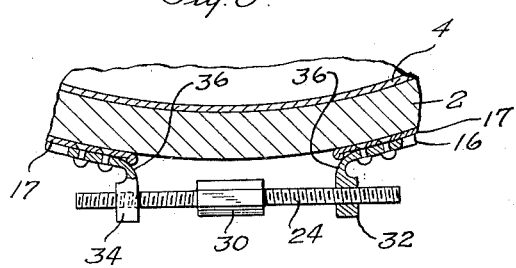
INVENTOR
GEORGE ALBERT LYON
BY
ATTORNEYS Patented Jan. 16, 1934

1,943,922

UNITED STATES PATENT OFFICE 1,943,922

COVER FOR SPARE TIRES

George Albert Lyon, Allenhurst, N. J., assignor to Lyon Incorporated, Asbury Park, N. J., a corporation of Delaware Application December 22, 1928
Serial No. 327,816

11 Claims. (Cl. 150—54)

This invention relates to covers for spare tires carried upon automobiles.

The usual spare tire cover consists of a canvas casing coated with waterproofing material and formed to fit the contour of the spare tire and carrier. These tire covers are unattractive in appearance and are subject to shrinkage so that they are difficult to apply to a tire after having been in use for a relatively short time. Such casings often cannot be applied to a tire so that they will fit the tire smoothly. They also wear out quickly and are readily torn, particularly when struck by another car, as often happens in congested traffic conditions. Such covers do not constitute a satisfactory protection for the tire against damage in case of collision. The ordinary tire cover, since it is made of highly flexible material, not only wrinkles readily, but when applied to a tire, conforms to the projections and depressions on a tire so that it does not present a smooth outer surface.

The principal objects of the present invention are to improve the construction and mode of operation of spare tire covers and to produce a cover which may be very readily applied to and removed from a tire, which will present a highly attractive appearance, and which will furnish a reliable and satisfactory protection for the tire.

With these and other objects in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawing illustrating the invention in its preferred form, and the following detailed description of the constructions therein shown.

In the drawing—

Fig. 1 is a view in front elevation of a spare tire with a tire cover embodying the invention applied thereto;

Fig. 2 is a sectional view taken substantially on the line 2—2 of Fig. 1;

Fig. 3 is a detail sectional view taken substantially on the line 3—3 of Fig. 2; and Fig. 4 is a view similar to Fig. 3 illustrating a slightly modified construction.

The tire cover shown in the drawing of this application is applied to a tire indicated at 2 mounted on a rim 4. In the form of the invention shown, the tire cover consists of a ring of relatively stiff sheet material, such as sheet metal, and is constructed to cover the periphery of the tire and one side of the tire, the side of the tire occupying the outside position when the tire is supported on a car. The tire cover comprises a portion 8 formed to extend from the periphery of the tire inwardly over the outer side of the tire and a portion 10 formed to extend about the periphery of the tire. The portion 8 of the cover and the portion 10 are preferably secured rigidly together and may be formed from a single piece of sheet metal as shown in Figs. 1 and 2.

The side portion 8 of the cover is constructed with a series of tapered corrugations indicated at 12, these corrugations diminishing in width from the inner margin of the side portion to the outer margin thereof. This portion of the cover, as shown in Fig. 2 is concavely curved from its outer margin to the central part thereof opposite the high point in the bulge in the side portion of the tire, and from this point extends inwardly in a general plane substantially parallel with the central plane of the tire. The portion 8 preferably is arranged to engage the convex side portion of the tire at the high point thereof, as shown in Fig. 2. A shoulder 14 is preferably formed at the juncture of the side portion 8 of the cover with the peripheral portion 10 thereof. The inner margin of the portion 8 is preferably turned back upon the body of said portion, as indicated at 15 to form a finished edge.

The portion 8 of the cover is concave in cross-section upon its inner side from its outer margin which joins the shoulder 14 to substantially the central part thereof adjacent the central plane of the tire, as shown in Fig. 2, so as to fit the tread portion of the tire. From its central part to its inner margin, the portion 10 has a substantially cylindrical form on the inside thereof or is flared slightly outwardly so that it may be more readily passed over the tread portion of the tire. The material at the inner margin of the portion 10 is turned outwardly at an angle to the body of said portion as indicated at 16 so as to form a finished edge.

The portions 8 and 10 of the cover form a ring shaped to fit about the tire. This ring is so constructed that it is normally somewhat smaller in size than required to fit the tire to which it is to be applied and is expanded in placing it over the tire. The ring is constructed so as to provide a space between the ends of the ring indicated at 17, when it is applied to a tire, as clearly shown in Fig. 3.

In order to cover the side of the tire between the ends of the portion 8 of the cover, a cover plate 20 is secured to one end of said portion and is arranged to overlap the other end of the same, as shown in Figs. 1 and 3. This plate is provided with a bordered area 22 to which the initials of the owner of the car may be applied.

The tire cover is applied to the tire in an expanded condition so that it will readily pass over the periphery of the tire and is then contracted upon the tire to hold the cover securely in place. The corrugations 12 in the portion 8 of the cover render this portion quite flexible so that the cover readily may be expanded and contracted. These corrugations also strengthen the portion 8 and furnish considerable resilience to the lateral bending thereof.

In the present construction means is provided for both expanding and contracting the cover to facilitate applying the cover to and removing the same from the tire. This means comprises a screw 24 having right and left screw threads upon opposite ends thereof which engage respectively in correspondingly threaded openings in brackets 26 and 28 secured to the ends 17 of the peripheral portion 8 of the cover. This screw is provided at its central part with a polygonal block 30 secured thereto to which a wrench may be applied in rotating the screw. Thus by rotating the screw 24 in one direction, the ends of the cover will be separated to expand the cover, and by rotating the screw in the opposite direction, the ends will be brought together to contract the cover.

The screw 24 may fit within the brackets 26 and 28 with sufficient looseness to compensate for the angular movement of the brackets produced as the brackets are moved toward and from each other on the screw. Fig. 4 of the drawings shows a different construction, however, for compensating for this action. As shown in this figure, the screw passes through threaded openings in brackets 32 and 34 secured to the ends of the cover. Each of these brackets is formed with a relatively thin portion indicated at 36 connecting the part of the bracket secured to the cover and the part through which the screw 24 passes. With this construction the screw 24 may fit closely in the threaded openings in the brackets, and as the brackets move toward and from each other in contracting and expanding the cover, the relatively thin portions 36 of each bracket will allow a yield between the part of the bracket engaged by the screw and the part thereof secured to the cover.

In applying the tire cover to a tire, the cover is first expanded by rotating the screw 24 in a direction to separate the ends of the cover. The cover is then positioned with the portion 10 extending about the periphery of the tire and with the portion 8 engaging the outer side of the tire, as clearly shown in Fig. 2. Because of the cross-sectional formation of the portion 10 of the cover, the cover may be readily passed over the tire and placed in this position. The screw 24 is then rotated in the opposite direction to carry the ends of the cover toward each other until the portion 10 firmly engages the tread portion of the tire to secure the tire in place. The grip of the portion 10 upon the periphery of the tire produced by the contracting force exerted by the screw 24 will securely hold the tire cover in position. The cover may be very readily removed from the tire by rotating the screw 24 in the opposite direction to expand the cover. The corrugations in the portion 8 of the cover render the same comparatively flexible so that it readily may be expanded and contracted.

The tire cover above described may be readily manufactured from a single strip of sheet metal by rolling out the metal between suitably shaped rollers. The metal is preferably rolled out in a cold condition so as to give the same a high degree of resiliency.

The cover presents a very attractive appearance and furnishes a reliable, satisfactory protection for the tire. The corrugations 12 in the cover radiating from the axis of the tire greatly increases the attractiveness of the appearance of the cover, particularly when the outer surface of the portion 8 has a high polish. The cover may be applied to and removed from the tire by simple, easy and convenient manual operations and will be securely held on the tire by the contraction of the same produced by the screws 24. The cover also has the advantages that it is simple in construction and that it may be cheaply manufactured by machine operations.

The tire cover occupies very little space at the side or about the periphery of the tire so that the tire with the cover applied thereto will fit in a socket or well in the running board, with which many cars are at present provided. When the tire with the cover applied is placed in the socket, the cover cannot be removed from the tire without first removing the tire from the socket. Thus the locking of the tire in the well also locks the cover in position.

It will be understood that except as defined in the claims, the invention is not limited to the particular construction and arrangement of parts of the illustrated embodiment of the invention, but that the invention may be embodied in other forms within the scope of the claims.

Having explained the nature and object of the invention, and having specifically described a construction embodying the invention in its preferred form, what is claimed is:

1. A cover for the spare tires of automobiles comprising a radially expansible and contractible ring of relatively stiff sheet material arranged to extend about a tire and having a portion for covering one side of the tire formed with transverse corrugations to render the ring readily flexible radially and a portion for covering the periphery of the tire, and means carried by said ring for expanding and contracting the ring.

2. In an automobile spare tire cover, a split ring portion for disposition on the tread of the tire, a side portion associated therewith for disposition over the exposed outer side wall of the tire, and means mounted thereon for forcibly spreading the ends of the split ring portion apart to hold them spaced while the cover is being applied to the tire and for thereafter contracting the ring portion to draw the ends of the ring portion toward each other to hold the ring portion in position on the tire.

3. In an automobile spare tire cover, a split annular ring of curved convex cross section for disposition on the tread of the tire and having means mounted thereon for forcibly spreading and holding the ends of the ring spaced apart to enable the curved ring to be bodily shoved over the tread and for thereafter drawing the ends of said ring toward each other to hold the ring in position on the tire.

4. In a spare tire cover construction, a resilient split, expansible and contractible ring for disposition on the tire tread and having carried thereby means for expanding it and holding it open to be placed over the tire and for thereafter contracting the ring into retained holding cooperation with the tire.

5. In a spare tire cover construction, a resilient split, expansible and contractible ring for disposition on the tire tread and mechanical means carried thereby adjacent the ends of the ring for forcibly expanding it to be placed over the tire and upon the release of said means for contracting said ring into holding cooperation with the tire.

6. In a spare tire cover construction, a resilient split and expansible and contractible ring for disposition on the tire tread and having means carried thereby for forcibly expanding it and holding it open to be placed over the tire and for thereafter forcibly contracting the ring into holding cooperation with the tire.

7. An automobile spare tire cover comprising a side piece for disposition over a side wall of a tire, and a split resiliently expansible and contractible ring piece associated therewith for disposition on the tire tread and provided with mechanical means for forcibly expanding it for loose application to the tire, said ring piece being thereafter contractible on the tire into holding cooperation therewith, said means being connected to said split ring piece adjacent its ends for forcibly moving said ends to open the ring piece and for thereafter contracting the ring piece on the tire said ends being alined during such movement.

8. An automobile spare tire cover comprising a side piece for disposition over a side wall of a tire, and a split resiliently expansible and contractible ring piece associated therewith for disposition on the tire tread and provided with mechanical means for forcibly expanding it for loose application to the tire, said ring piece being thereafter contractible on the tire into holding cooperation therewith, said means being connected to said split ring piece adjacent its ends for forcibly moving said ends to open the ring piece and for therafter contracting and tightening the ring piece on the tire.

9. An automobile spare tire cover comprising a side piece for disposition over a side wall of a tire, and a split resiliently expansible and contractible ring piece associated therewith for disposition on the tire tread and provided with means for expanding it and holding it open for loose application to the tire and for thereafter contracting the ring piece on the tire into holding cooperation therewith, and having a rear edge in close proximity to the rear side of the tire when the ring piece is in retained engagement with the tire, said means including elements connected to the ends of said split ring piece and extending across the split for holding the ring open during its application to the tire.

10. An automobile spare tire cover comprising a side piece for disposition over a side wall of a tire, and a split, resiliently expansible and contractible ring piece associated therewith for disposition over the tread of the tire, one of said pieces being corrugated to augment the expansible and contractible characteristics of the cover and means carried by said ring piece for expanding and contracting the ring piece.

11. An automobile spare tire cover comprising a split annular side piece for disposition over the side wall of a tire and a split, resiliently expansible and contractible ring piece associated therewith for disposition over the tire tread, said side piece being corrugated to augment its expansible and contractible characteristics and means carried by the ring piece for expanding and contracting the ring piece.

GEORGE ALBERT LYON.